US012779754B2

(12) United States Patent
Yokota et al.

(10) Patent No.: US 12,779,754 B2
(45) Date of Patent: Nov. 3, 2026

(54) OPERATING CONDITION CORRECTION METHOD, OPERATING CONDITION CORRECTION DEVICE, MOLDING MACHINE AND NON-TRANSITORY COMPUTER READABLE RECORDING MEDIUM

(71) Applicant: THE JAPAN STEEL WORKS, LTD., Tokyo (JP)

(72) Inventors: Takumi Yokota, Tokyo (JP); Akihiko Saeki, Tokyo (JP); Takashi Akagi, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 217 days.

(21) Appl. No.: 18/641,305

(22) Filed: Apr. 19, 2024

(65) Prior Publication Data

US 2024/0359382 A1 Oct. 31, 2024

(30) Foreign Application Priority Data

Apr. 25, 2023 (JP) ................................ 2023-071532

(51) Int. Cl.
*B29C 45/76* (2006.01)
*G05B 13/02* (2006.01)
(Continued)

(52) U.S. Cl.
CPC ........ *B29C 45/7693* (2013.01); *B29C 45/766* (2013.01); *B29C 2945/76979* (2013.01);
(Continued)

(58) Field of Classification Search
CPC . B29C 45/768; B29C 45/7686; B29C 45/766; B29C 45/76; G05B 19/418;
(Continued)

(56) References Cited

U.S. PATENT DOCUMENTS 5,035,598 A 7/1991 Fujita et al.
6,600,961 B2 * 7/2003 Liang ................. B29C 45/7693
700/109

(Continued)

FOREIGN PATENT DOCUMENTS

DE 19518804 A1 12/1995
EP 0756219 A2 1/1997
JP 2022-045698 A 3/2022

OTHER PUBLICATIONS

Extended European Search Report for European Patent Application No. 24172347.7, Sep. 27, 2024.

*Primary Examiner* — Ronald D Hartman, Jr.
(74) *Attorney, Agent, or Firm* — Potomac Law Group, PLLC

(57) ABSTRACT

An operating condition correction method of an industrial machine, comprises: acquiring measurement data obtained by measuring a state of the industrial machine and inspection data obtained by inspecting a state of a product manufactured by the industrial machine; calculating a correction quantity of the operating condition based on the acquired measurement data and inspection data using a plurality of learners trained with an association between the measurement data as well as the inspection data and a correction quantity of the operating condition; determining appropriateness of a correction direction of each of a plurality of the correction quantities calculated using the plurality of learners; and correcting the operating condition based on one or more of the correction quantities determined as having the correction direction being appropriate.

11 Claims, 10 Drawing Sheets

(51) Int. Cl.
*G05B 15/00* (2006.01)
*G05B 19/418* (2006.01)

(52) U.S. Cl.
CPC .............. *G05B 13/02* (2013.01); *G05B 15/00* (2013.01); *G05B 19/418* (2013.01)

(58) Field of Classification Search
CPC ........ G05B 15/00; G05B 13/04; G05B 13/02; G06N 20/10; G06N 3/08; G06N 20/00; G06N 20/20
USPC ............................................................ 700/28
See application file for complete search history.

(56) References Cited

U.S. PATENT DOCUMENTS

| | | | | |
|---|---|---|---|---|
| 2017/0031330 | A1* | 2/2017 | Shiraishi | G06N 7/01 |
| 2018/0341248 | A1* | 11/2018 | Mehr | G05B 19/4099 |
| 2021/0379807 | A1* | 12/2021 | Okubo | B29C 45/76 |
| 2022/0297362 | A1* | 9/2022 | Yu | B29C 45/766 |
| 2022/0339837 | A1 | 10/2022 | Hirano et al. | |
| 2023/0234272 | A1* | 7/2023 | Burns | B29C 45/768<br>264/40.4 |
| 2023/0325562 | A1 | 10/2023 | Hirano | |

* cited by examiner

FIG.6

242b

| Types of defect / Correction parameter | Flash | Short | ··· |
|---|---|---|---|
| Holding pressure | + | − | ··· |
| Injection/pressure holding switchover position | − | + | ··· |
| Injection speed | + | − | ··· |

OPERATING CONDITION CORRECTION METHOD, OPERATING CONDITION CORRECTION DEVICE, MOLDING MACHINE AND NON-TRANSITORY COMPUTER READABLE RECORDING MEDIUM

REFERENCE TO RELATED APPLICATIONS

This application claims priority from Japanese Patent Application No. 2023-071532 filed on Apr. 25, 2023. The entire content of the priority application is incorporated herein by reference.

BACKGROUND ART

There is provided a molding machine system that corrects molding conditions of an injection molding machine using a machine learner so that a molded product increases proximity to a conforming item (Japanese Patent Application Publication Laid-Open No. 2022-045698, for example).

SUMMARY

The correction accuracy for the molding conditions proposed by the learner is not 100%, which causes such a problem that the learner may perform a reverse proposal leading to inappropriate correction of molding conditions. The reverse proposal is a proposal that worsens the defect of a molded product.

Such a problem occurs not only in an injection molding machine, but in other industrial machines that correct the operating conditions using learners.

An object of the present disclosure is to provide an operating condition correction method, an operating condition correction device, a molding machine and a computer program that can exclude a reverse proposal by a learner and can correct operating conditions more appropriately.

An operating condition correction method according to one aspect of the present disclosure is an operating condition correction method of an industrial machine, and comprises: acquiring measurement data obtained by measuring a state of the industrial machine and inspection data obtained by inspecting a state of a product manufactured by the industrial machine; calculating a correction quantity of the operating condition based on the acquired measurement data and inspection data using a plurality of learners trained with an association between the measurement data and the inspection data and a correction quantity of the operating condition; determining appropriateness of a correction direction of each of a plurality of the correction quantities calculated using the plurality of learners; and correcting the operating condition based on one or more of the plurality of the correction quantities determined as having the correction direction being appropriate.

An operating condition correction device according to one aspect of the present disclosure is an operation condition correction device for correcting an operating condition of an industrial machine, and comprises: an acquisition unit that acquires measurement data obtained by measuring a state of the industrial machine and inspection data obtained by inspecting a state of a product manufactured by the industrial machine; a plurality of learners, trained with an association between the measurement data as well as the inspection data and a correction quantity of the operating condition, that calculates a correction quantity of the operating condition based on the acquired measurement data and inspection data; a determination unit that determines appropriateness of a correction direction of each of a plurality of the correction quantities calculated using the plurality of learners; and a correction unit that corrects the operating condition based on one or more of the plurality of the correction quantities determined as having the correction direction being appropriate.

A molding machine according to one aspect of the present disclosure is provided with the above-mentioned operating condition correction device.

A computer program according to one aspect of the present disclosure is a computer program causing a computer to execute processing of correcting an operating condition of an industrial machine, and comprises: acquiring measurement data obtained by measuring a state of the industrial machine and inspection data obtained by inspecting a state of a product manufactured by the industrial machine; calculating a correction quantity of the operating condition based on the acquired measurement data and inspection data using a plurality of learners trained with an association between the measurement data as well as the inspection data and a correction quantity of the operating condition; determining appropriateness of a correction direction of each of a plurality of the correction quantities calculated using the plurality of learners; and correcting the operating condition based on one or more of the plurality of the correction quantities determined as having the correction direction being appropriate.

The present disclosure makes it possible to correct the operating conditions more appropriately while excluding the reverse proposal by a learner.

The above and further objects and features will more fully be apparent from the following detailed description with accompanying drawings.

BRIEF DESCRIPTION OF DRAWINGS

FIG. 6 is a conceptual diagram showing a direction definition table according to the second embodiment.

DESCRIPTION

Specific examples of an operating condition correction method, an operating condition correction device, a molding machine and a computer program according to embodiments of the present disclosure will be described below with reference to the drawings. Furthermore, at least parts of the following embodiments described below may arbitrarily be combined. It should be noted that the invention is not limited to these examples, and is indicated by the scope of claims, and is intended to include all modifications within the meaning and scope equivalent to the scope of claims.

First Embodiment

Figure 1:
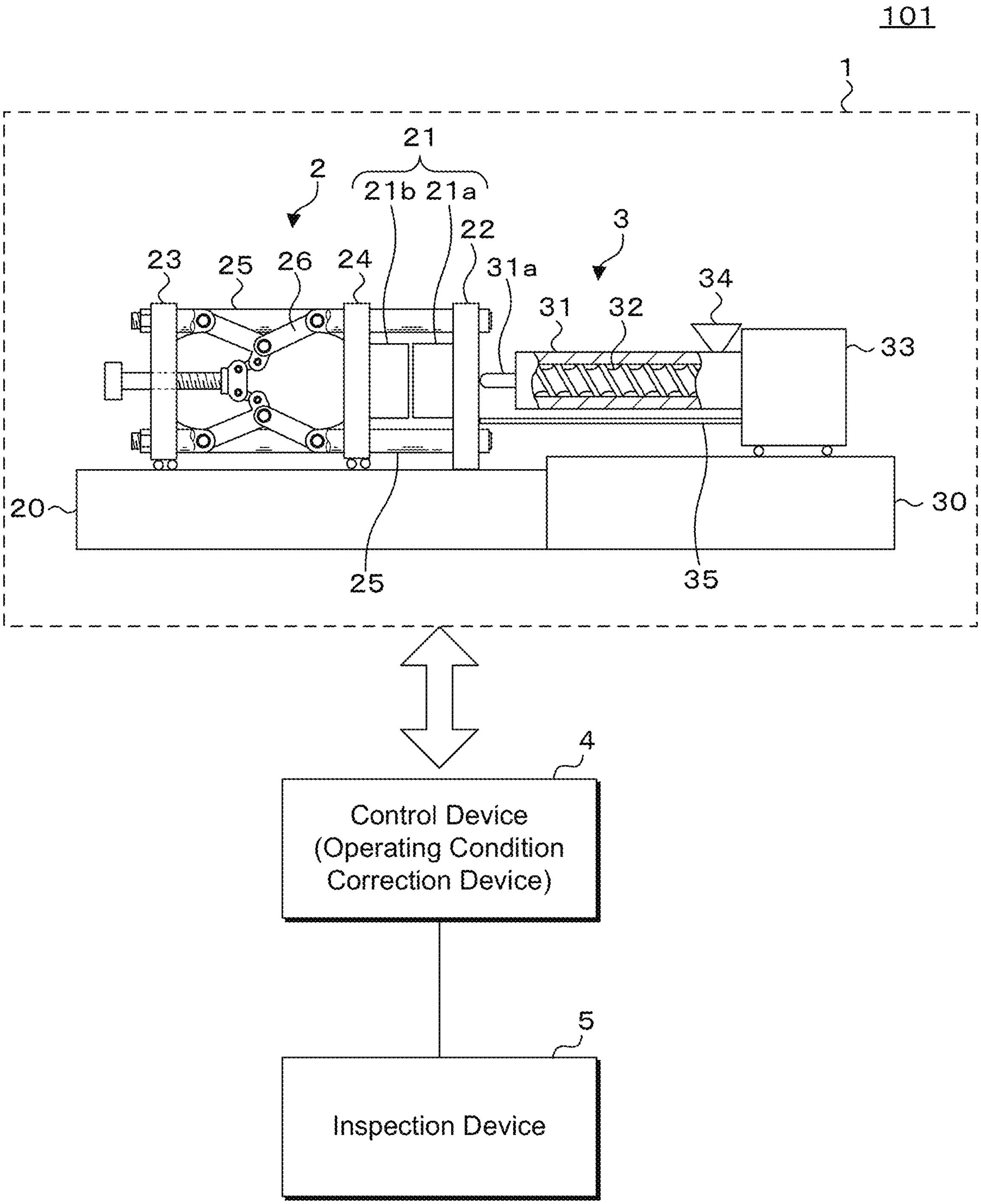
FIG. 1 is a schematic view illustrating an example of the configuration of an injection molding machine according to a first embodiment.

FIG. 1 is a schematic view illustrating an example of the configuration of an injection molding machine 101 according to the present embodiment. The injection molding machine 101 according to the present embodiment is equipped with a mold clamping device 2 that clamps a metal mold 21, an injection device 3 that plasticizes and injects molding material, a control device 4 and an inspection device 5. The mold clamping device 2 and the injection device 3 constitute a molding machine body 1. The control device 4 functions as an operating condition correction device according to the present embodiment.

The mold clamping device 2 is equipped with a fixed platen 22 fixed on a bed 20, a mold clamping housing 23 that slides over the bed 20 and a movable platen 24 that similarly slides over the bed 20. The fixed plate and the mold clamping housing 23 are connected with multiple, e.g., four tie bars 25, 25, . . . . The movable platen 24 is structured so as to be slidable between the fixed platen 22 and the mold clamping housing 23. Between the mold clamping housing 23 and the movable platen 24, a mold clamping mechanism 26 is provided.

The mold clamping mechanism 26 is composed of a toggle mechanism, for example. Note that the mold clamping mechanism 26 may be composed of a direct clamping mechanism, i.e., a mold clamping cylinder. The fixed platen 22 and the movable platen 24 are respectively provided with a fixed mold 21*a* and a movable mold 21*b*, and the metal mold 21 is configured to open or close when the mold clamping mechanism 26 is driven.

The injection device 3 is located on a base 30. The injection device 3 is equipped with a heating cylinder 31 having a nozzle 31*a* at the tip thereof and a screw 32, which is rotatable in circumferential and axial directions, provided inside the heating cylinder 31. The screw 32 is driven in the rotational and axial directions by a drive mechanism 33. The drive mechanism 33 is composed of a rotary motor that drives the screw 32 in the rotational direction and a motor that drives the screw 32 in the axial direction and the like. Since the drive mechanism 33 illustrated in FIG. 1 is covered with a cover, the internal configuration thereof is not illustrated.

A hopper 34 into which molding material is inserted is provided near the rear end of the heating cylinder 31. The injection molding machine 101 is equipped with a nozzle touch device 35 that moves the injection device 3 in the front-back direction (right-left direction in FIG. 1). When the nozzle touch device 35 is driven, the injection device 3 advances to allow the nozzle 31*a* of the heating cylinder 31 to be in touch with a close-contact portion of the fixed platen 22.

Figure 2:
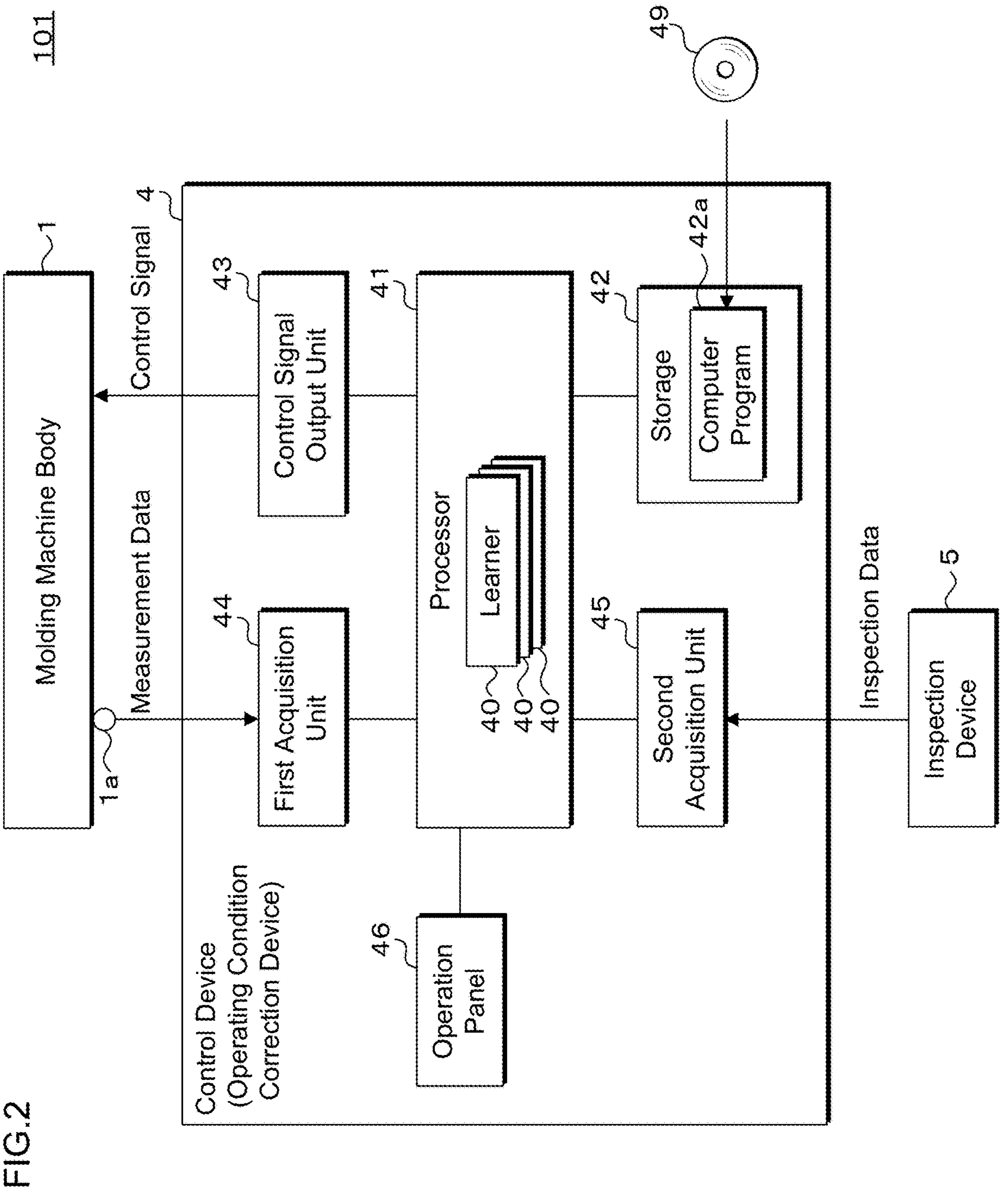
FIG. 2 is a block diagram illustrating an example of the configuration of the injection molding machine according to the first embodiment.

FIG. 2 is a block diagram illustrating an example of the configuration of the injection molding machine 101 according to the present embodiment. The control device 4 is a computer that controls the operation of the mold clamping device 2 and the injection device 3 and is equipped with a processor 41, a storage 42, a control signal output unit 43, a first acquisition unit 44, a second acquisition unit 45 and an operation panel 46 as hardware components. The processor 41 has multiple learners as functional parts. Note that parts of the multiple learners 40 may be realized in hardware.

The control device 4 is a device for correcting molding conditions (operating conditions) of the injection molding machine 101 (see FIG. 1). Note that the control device 4 may be a server device connected to a network. Moreover, the control device 4 may be configured with multiple computers to perform distributed processing, may be realized by multiple virtual machines configured in a single server, or may be realized using a cloud server.

The processor 41 includes an arithmetic processing circuit such as a CPU (Central Processing Unit), a multi-core CPU, a GPU (Graphics Processing Unit), a General-purpose computing on graphics processing units (GPGPU), a Tensor Processing Unit (TPU), an Application Specific Integrated Circuit (ASIC), an Field-Programmable Gate Array (FPGA) and an Neural Processing Unit (NPU), an internal storage device such as a ROM (Read Only Memory) and a RAM (Random Access Memory), an I/O terminal, a timer unit and the like. The processor 41 implements a molding condition correction method according to the present embodiment by executing a computer program (program product) 42*a* stored in the storage 42 described later. Note that each functional part of the control device 4 may be realized in software, or some or all of the functional parts thereof may be realized in hardware.

The storage 42 is a nonvolatile memory such as a hard disk, an Electrically Erasable Programmable ROM (EEPROM), a flash memory or the like. The storage 42 stores the computer program 42*a* for causing the computer to machine-train a correction method of the molding conditions depending on the states of the injection molding machine 101 and a molded product, and to execute operating condition correction processing. The storage 42 stores various coefficients that feature the respective multiple learners 40.

The computer program 42*a* according to the present embodiment may be recorded on a recording medium 49 so as to be readable by the computer. The storage 42 stores the computer program 42*a* read from the recording medium 49 by a reader. The recording medium 49 is a semiconductor memory such as a flash memory. Furthermore, the recording medium 49 may be an optical disc such as a CD (Compact Disc)-ROM, a DVD (Digital Versatile Disc)-ROM or a BD (Blu-ray (registered trademark) Disc). Moreover, the recording medium 49 may be a magnetic disk such as a flexible disk or a hard disk, or a magneto-optical disk.

In addition, the computer program 42*a* according to the present embodiment may be downloaded from an external server connected to a communication network and stored in the storage 42.

The multiple learners 40 correspond to multiple models trained on correction quantities of the molding conditions to be set to the injection molding machine 101 using different algorithms. Each of the multiple learners 40 corresponds to a model that outputs a correction quantity for the molding conditions when measurement data and inspection data are input.

The multiple learners 40 include, for example, a reinforcement learning model, a learning model trained with supervised learning and a regression model trained by a gradient method. Models trained with different training data using the same algorithm may be employed as multiple different learners 40. Note that the types of the learners 40 are not limited to the examples described above. The multiple learners 40, for example, may be constructed using algorithms such as an arbitrary neural network model, decision tree, random forest, Support Vector Machine (SVM) and the like.

The correction quantity output from each of the learners 40 is generally a vector quantity consisting of change values of multiple parameters. The correction quantity required to correct molding conditions related to molding defects such as flash and a short shot of a molded product is expressed as, for example, a change value in holding pressure, a change value in holding pressure switchover position and a change value in injection speed. The direction of the vector of the correction quantity is referred to as a correction direction below.

The correction quantities output from the multiple learners 40 generally include correction quantities related to the reverse proposal. The correction quantities related to the reverse proposal include the change values opposite in sign (positive or negative) to accurate correction quantities. As described below, the processor 41 according to the present embodiment executes processing of excluding the correction quantities related to the reverse proposal, selecting the correction quantities in the proper correction direction and correcting the molding condition to thereby appropriately correct the operating condition.

The control signal output unit 43 outputs, to the molding machine body 1, a control signal for controlling the operation of the injection molding machine 101 according to the control by the processor 41 based on the molding conditions.

The operation panel 46 is an interface for allowing setting of molding conditions or the like of the injection molding machine 101 and for operating the action of the injection molding machine 101. The operation panel 46 is equipped with a display panel and an operation device. The display panel, which is a display device such as a liquid crystal display panel, an organic EL display panel or the like, displays an acceptance screen to accept the settings of molding conditions for the injection molding machine 101 according to the control by the processor 41 or displays the state of the injection molding machine 101 and the implementation status of the molding condition correction method according to the present embodiment. The operation device, which is an input device for inputting and correcting the molding conditions of the injection molding machine 101, has an operation button, a touch panel and the like. The operating device sends data indicating the accepted molding conditions to the processor 41.

Configuration parameters related to various molding conditions are set to the injection molding machine 101. The molding conditions include an injection start position, a resin temperature in the metal mold, a nozzle temperature, a cylinder temperature (heater temperature), a hopper temperature, a mold clamping force, an injection speed, an injection acceleration, an injection peak pressure (injection pressure) and an injection stroke. The molding conditions further include a cylinder tip resin pressure, a reverse protection ring seated state, a holding pressure, an injection/pressure holding switchover speed, an injection/pressure holding switchover position, a holding pressure completion position, a cushion position, a measured back pressure and measured torque. Moreover, the molding conditions include a measurement completion position, a screw retreat speed, a cycle time, a mold closing time, an injection time, a holding time, a measurement time and a mold opening time. In addition, the molding conditions include a cooling time, a screw speed, a mold opening and closing speed, an ejection speed and the number of ejections.

The injection molding machine 101 configured with these configuration parameters operates according to these configuration parameters. Of the molding conditions described above, the configuration parameters such as a holding pressure, an injection/pressure holding switchover position and an injection speed are related to molding defects such as flash, a short shot or the like. In the present embodiment, an example is described where the holding pressure [MPa], the injection/pressure holding switchover position [mm] and the injection speed [mm/sec] are corrected using the learners 40.

The first acquisition unit 44 is an input circuit that acquires measurement data obtained by measuring the state of the injection molding machine 101.

The mold clamping device 2 and the injection device 3 (see FIG. 1) are equipped with one or more sensors 1*a* for detecting information indicating the state of the injection molding machine 101 and physical quantities necessary for controlling the operation of the molding machine body 1. The sensor 1*a* is connected to the first acquisition unit 44. The physical quantities include, for example, voltage, current, temperature, humidity, forces such as torque, pressure, speed, acceleration, rotation angle, position of movable parts, rate, velocity of fluid and the like. The sensor 1*a* includes, for example, a current sensor, a voltage sensor, a temperature sensor, a humidity sensor, a torque sensor, a pressure sensor, a speed sensor, an acceleration sensor, a rotation angle sensors, a position sensor, a flow sensor, a flow meter and the like. The sensor 1*a* outputs a measurement signal indicating a physical quantity to the control device 4. The measurement signal output from the sensor 1*a* is input to the first acquisition unit 44, which acquires the measurement signal as measurement data.

The measurement data indicates the operational status of the injection molding machine 101 and includes, for example, a cycle time [sec], an injection time [sec], a holding time [sec], an injection/pressure holding switchover position [mm], an injection/pressure holding switchover speed [mm/sec], an injection/pressure holding switchover pressure [MPa], a cushion position [mm], a holding complete position [mm], a measurement time [sec], a back pressure [MPa], a measurement completion position [mm] and the like. Note that, for each position, a reverse direction of the screw 32 (right direction in FIG. 1) is regarded as positive.

The second acquisition unit 45 is an input circuit for acquiring inspection data obtained by inspecting the state of a molded product molded by the injection molding machine 101. The second acquisition unit 45 is connected to the inspection device 5. The inspection device 5, which includes a camera, a distance measuring sensor and a weighing sensor for detecting the state of a molded product, measures the physical quantities related to the state of the molded product and obtains inspection data indicating the state of the molded product based on the physical quantity data obtained by measurement. The inspection data is data indicating the area of flash and the area of a short shot of a molded product, for example. In addition, the inspection data is data indicating flash due to resin viscosity or a short shot due to resin viscosity.

Figure 3:
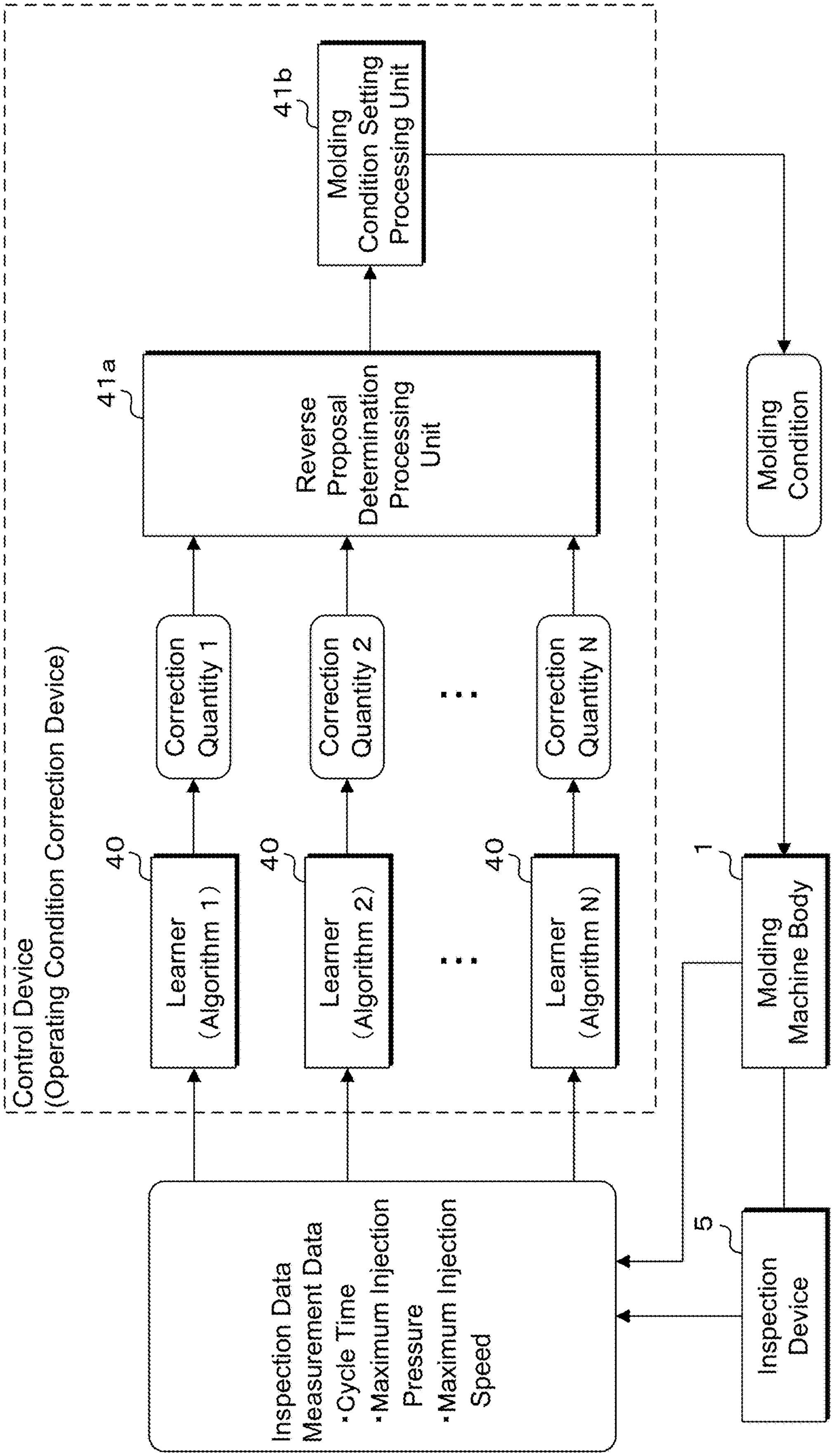
FIG. 3 is a conceptual diagram illustrating an operating condition correction processing method according to the first embodiment.

FIG. 3 is a conceptual diagram illustrating an operating condition correction processing method according to the first embodiment. As illustrated in FIG. 3, the processor 41 is equipped with a reverse proposal determination processing unit 41*a* and a molding condition setting processing unit 41*b* as functional parts in addition to the multiple kinds of learners 40.

The measurement data acquired by the first acquisition unit 44 and the inspection data obtained by the second acquisition unit 45 are input to each of the multiple learners 40. The multiple learners 40 represents models that operate according to different algorithms 1, 2, . . . . N. The multiple learners 40 each calculate a correction quantity for the molding conditions based on the input measurement data and inspection data.

The reverse proposal determination processing unit 41*a* is a functional part that determines whether or not each of the correction quantities output from the multiple learners 40 is a correction quantity related to the reverse proposal. For example, the reverse proposal determination processing unit 41*a* determines whether or not each of the correction quantities output from the learners 40 is the correction quantity related to the reverse proposal by a majority decision. The reverse propos al determination processing unit 41*a* excludes the correction quantities determined as a reverse proposal and selects the correction quantities having a accurate correction direction.

Example 1 of Determination Method

The reverse proposal determination processing unit 41*a* according to Example 1 specifies the number of positive change values and the number of negative change values output from the multiple learners 40 for each of the multiple configuration parameters, and selects the larger number of change values while excluding the smaller number of change values.

For example, assuming that correction quantities are output from five learners 40 and three positive change values and two negative change values for correcting a first configuration parameter are output, the reverse proposal determination processing unit 41*a* selects the positive change value. If one positive change value and four negative change values for correcting a second configuration parameter are output, the reverse proposal determination processing unit 41*a* selects the negative change value.

Example 2 of Determination Method

In Example 2, it is assumed that the change values constituting correction quantities of the reverse proposal have respective signs (positive or negative) opposite from those of the change values constituting accurate correction quantities. In other words, a case is considered where the multiple correction quantities output from the learners 40 include accurate correction quantities and correction quantities with respective signs opposite to those of the accurate correction quantities. Here, two sign combinations of change values constituting the correction quantities are possible. For example, the first combination includes the change values with positive, negative and positive signs, while the second combination includes the change values with negative, positive and negative signs.

The reverse proposal determination processing unit 41*a* according to Example 2 evaluates the number of correction quantities having the first combination and the number of correction quantities having the second combination, and determines the larger number of combinations of correction quantities as indicating a sign of the change values constituting the accurate correction quantities. The reverse proposal determination processing unit 41*a* selects the larger number of combinations of the correction quantities and excludes the smaller number of combinations of the correction quantities.

Example 3 of Determination Method

The reverse proposal determination processing unit 41*a* according to Example 3 evaluates a unit vector for each of the multiple correction quantities output from the multiple learners 40. The unit vector indicates a correction direction. The reverse proposal determination processing unit 41*a* performs clustering on the unit vectors of the respective correction quantities and determines the class to which a larger number of unit vectors belong as a class in the accurate correction direction. The reverse proposal determination processing unit 41*a* selects the correction quantities belonging to the class in the accurate correction direction and excludes the correction quantities belonging to the other classes.

Example 4 of Determination Method

The reverse proposal determination processing unit 41*a* according to Example 4 creates a reference unit vector for discriminating accurate correction quantities and correction quantities of the reverse proposal and excludes the correction quantities of the reverse proposal. The reference unit vector may be selected so that the sum of the absolute values of the inner products of each of all the correction quantities and the reference unit vector becomes the maximum. The reverse proposal determination processing unit 41*a* calculates the inner product of the reference unit vector and each of the multiple correction quantities and performs classification between the correction quantities of the positive inner products and the correction quantities of the negative inner products. The reverse proposal determination processing unit 41*a* compares the number of correction quantities of the positive inner products with the number of correction quantities of the negative inner products, determines the direction with the larger number of correction quantities as the direction of the accurate correction quantity and selects the correction quantities in the direction as correction quantities. For example, the correction quantities of the positive inner products (the larger number of correction quantities are positive) are selected as the accurate correction quantities and correction quantities of the negative inner products (the smaller number of correction quantities are negative) are excluded as the reverse correction quantities. The correction quantity of an inner product of 0 may be excluded as a correction quantity of a reverse proposal or selected as an accurate correction quantity.

The above-mentioned selection methods are mere examples, and any method can be used that is able to identify the correction direction of the correction quantities output from the multiple learners 40 and to select a larger number of correction quantities that are generally directed in the same correction direction.

The learner 40 that employs a gradient method as an optimal algorithm that does not or is unlikely to generate a reverse proposal makes it possible to select accurate correction quantities with a higher probability by the majority algorithm as described above. Likewise, the learner 40 employs Adam, momentum, Adagrad or the like as an optimal algorithm that does not or is unlikely to generate a reverse proposal, which makes it possible to select an accurate correction quantities with a higher probability.

The molding condition setting processing unit 41*b* is a functional part that corrects the molding condition using the correction quantity with an accurate correction direction and sets the corrected molding condition. For example, the molding condition setting processing unit 41*b* evaluates the average of correction quantities with the accurate correction direction and corrects the molding condition by the average of the correction quantities.

Specific Example of Average Correction for "Determination Method of Example 1"

For example, the case is considered where the configuration parameter x, the configuration parameter y and the configuration parameter z are corrected, and the combinations of the change values (Cx, Cy, Cz) constituting correction quantities respectively output from the three learners 40 are assumed as a first correction quantity=(−6, −3, 2), a second correction quantity=(3, 1, 4) and a third correction quantity=(5, −1, −2).

For Cx, −6 of the first correction quantity is discarded while the average of the second correction quantity and the third correction quantity is evaluated by (3+5)/2=4. For Cy, 1 of the second correction quantity is discarded while the average of the first correction quantity and the third correction quantity is evaluated by (−3−1)/2=−2. For Cz, −2 of the third correction quantity is discarded while the average of the first correction quantity and the second correction quantity is evaluated by (2+4)/2=3. The configuration parameters (x, y, z) of the molding condition are corrected and set using the averages of the correction quantities.

Specific Example of Average Correction for "Determination Method of Example 2"

For example, the case is considered where the configuration parameter x, the configuration parameter y and the configuration parameter z are corrected, and the combinations of the change values (Cx, Cy, Cz) constituting correction quantities respectively output from the three learners 40 are assumed as a first correction quantity=(6, −3, 1), a second correction quantity=(−3, 1, −4) and a third correction quantity=(5, −1, 2).

The first and third correction quantities are selected by a majority decision as the accurate correction quantities. For Cx, −3 of the second correction quantity is discarded while the average of the first and the third correction quantities is evaluated as (6+5)/2=5. For Cy, 1 of the second correction quantity is discarded while the average of the first and the third correction quantities is evaluated as (−3−1)/2=−2. For Cz, −4 of the second correction quantity is discarded while the average of the first and the third correction quantities is evaluated as (1+2)/2=1.5. The configuration parameters (x, y, z) of the molding conditions are corrected and set using the averages of the correction quantities.

Molded products produced by the injection molding machine 101 with the corrected molding conditions are inspected by the inspection device 5, and molding conditions are repeatedly corrected until the defects of the molded products are resolved.

Figure 4:
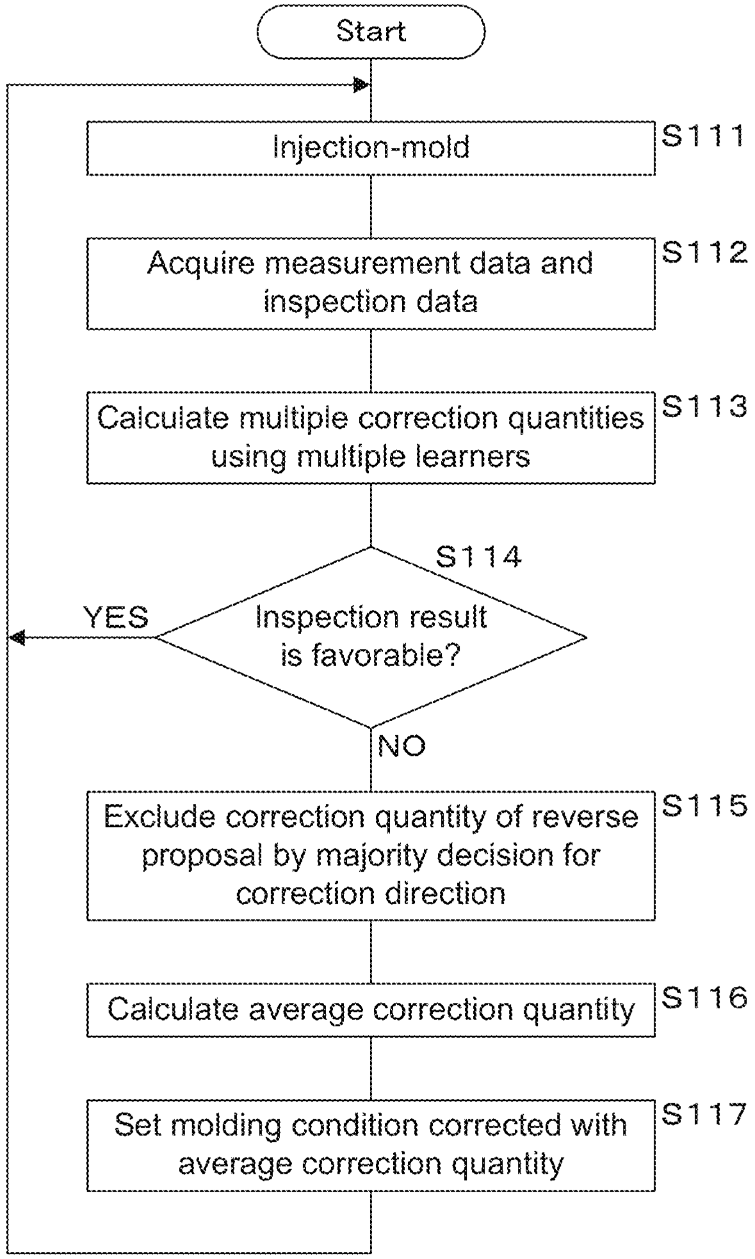
FIG. 4 is a flowchart illustrating an operating condition correction processing procedure according to the first embodiment.

FIG. 4 is a flowchart illustrating an operating condition correction processing procedure according to the first embodiment. The processor 41 of the control device 4 controls the operation of the molding machine body 1 to allow the molding machine body 1 to injection-mold a molded product (step S111). The processor 41 then acquires the measurement data and the inspection data at the first acquisition unit 44 and the second acquisition unit 45, respectively (step S112).

Next, the processor 41 inputs the measurement data and the inspection data that are acquired at step S112 to each of the multiple learners 40 and calculates multiple correction quantities (step S113). The multiple correction quantities are calculated using the multiple learners 40.

Subsequently, the processor 41 determines whether or not the inspection result is favorable, i.e. whether or not a molded product is a conforming item based on the inspection data (step S114). For example, the processor 41 determines the quality of a molded product by judging whether or not the area of flash and the area of a short shot are below a predetermined threshold.

If determining that the inspection result is favorable (step S114: YES), the processor 41 returns the processing to step S111. If determining that the inspection result is not favorable (step S114: NO), the processor 41 determines whether or not the correction quantity output from each of the learners 40 is the correction quantity related to the reverse proposal and excludes the correction quantity of the reverse proposal (step S115).

Next, the processor 41 calculates an average correction quantity using the accurate correction quantities excluding the correction quantities of the reverse proposal (step S116), sets the molding condition corrected with the average correction quantity (step S117) and returns the processing to step S111.

By repeating the steps S111 through S117, the molding conditions are corrected in a direction in which the defect of molded products are resolved.

The injection molding machine 101 and the control device 4 (operating condition correction device) according to the first embodiment configured as described above make it possible to exclude the reverse proposal by the learners 40 and correct the molding conditions more appropriately.

Specifically, by calculating multiple correction quantities of the molding conditions using the multiple learners 40, i.e., the multiple algorithms and excluding the correction quantities related to the reverse proposal, correction of the operating conditions using the accurate correction quantity is made possible.

In addition, the control device 4 can select the accurate correction quantities with the accurate correction direction from the multiple correction quantities output from the multiple learners 40 using a simple majority decision. In the first embodiment, even if the sign of change values constituting a correction quantity is unknown, whether it is positive or negative, accurate correction quantities can be selected while excluding reverse proposals.

In addition, the control device 4 is configured to calculate an average correction quantity using accurate multiple correction quantities excluding the correction quantities related to the reverse proposal and to correct the molding condition, which makes it possible to correct the molding condition using an unbiased correction quantity and optimize the molding condition.

Though an example of correcting the molding conditions of the injection molding machine 101 was described in the present embodiment, the present technique may be applied to control devices that correct molding conditions of an extruder and other molding machines. This technique may also be applied to control devices that correct the operating conditions of any industrial machine that manufactures products.

Second Embodiment

An injection molding machine 201 according to the second embodiment is different from the first embodiment in the method of excluding the correction quantity of the reverse proposal. Since the other configurations of the injection molding machine 201 are similar to those of the injection molding machine 101 in the first embodiment, corresponding parts are designated by similar reference codes and detailed description thereof will not be made.

Figure 5:
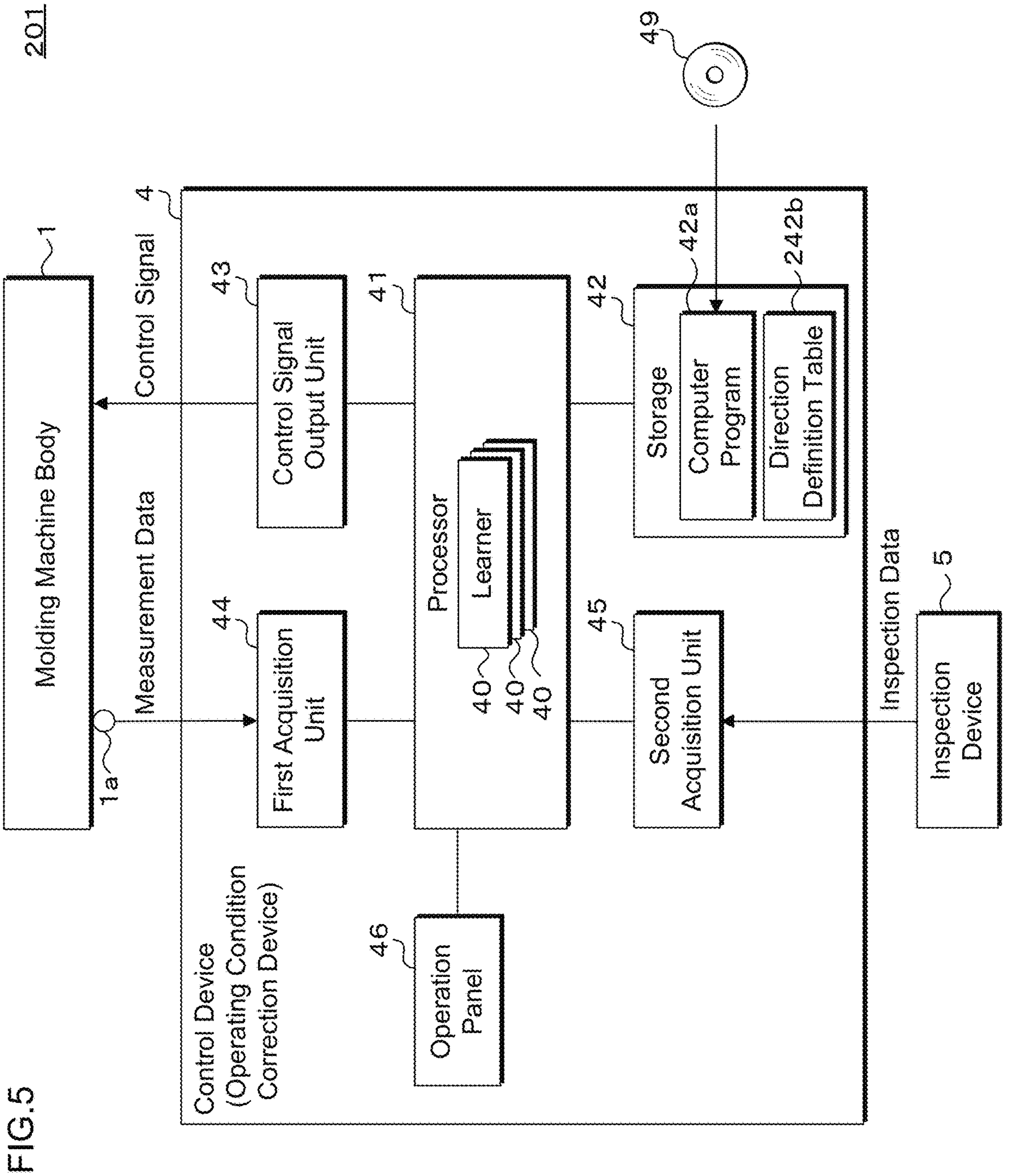
FIG. 5 is a block diagram illustrating an example of the configuration of an injection molding machine according to a second embodiment.

FIG. 5 is a block diagram illustrating an example of the configuration of the injection molding machine 201 according to the second embodiment. The storage 42 of the control device 4 according to the second embodiment stores a direction definition table 242*b* for identifying whether or not the correction quantity is a reverse proposal.

FIG. 6 is a conceptual diagram illustrating the direction definition table 242*b* according to the second embodiment. The direction definition table 242*b* stores the types of defects of a molded product and combinations of positive and negative signs of multiple change values constituting the accurate correction quantities in association with each other.

As to flash which is a defect of a molded product, for example, information indicating a positive change value of the holding pressure, a negative change value of the injection/pressure holding switchover position and a positive change value of the injection speed are associated with one another as an accurate correction direction. Likewise, as to a short shot which is also a defect of a molded product, information indicating a negative change value of the holding pressure, a positive change value of the injection/pressure holding switchover position and a negative change value of the injection speed are associated with one another as an accurate correction direction.

In particular, in the case of flash due to resin viscosity, information indicating a positive change value of the injection/pressure holding switchover position, a negative change value of the injection/pressure holding switchover speed and a negative change value of the injection/pressure holding switchover pressure are associated with one another as an accurate correction direction. In other words, the direction definition table 242*b* stores, in association with one another, data indicative of flash due to resin viscosity, data indicative of an appropriate change value of the injection/pressure holding switchover position being positive, data indicative of an appropriate change value of the injection/pressure holding switchover speed being negative and data indicative of an appropriate change value of the injection/pressure holding switchover pressure being negative. Likewise, in the case of a short shot due to resin viscosity, information indicating a negative change value of the injection/pressure holding switchover position, a positive change value of the injection/pressure holding switchover speed and a positive change value of the injection/pressure holding switchover pressure may be associated with one another as an accurate correction direction. In other words, the direction definition table 242*b* stores, in association with one another, inspection data indicative of a short shot due to resin viscosity, data indicative of an appropriate change value of the injection/pressure holding switchover position being negative, data indicative of an appropriate change value of the injection/pressure holding switchover speed being positive and data indicative of an appropriate change value of the injection/pressure holding switchover pressure being positive.

Figure 7:
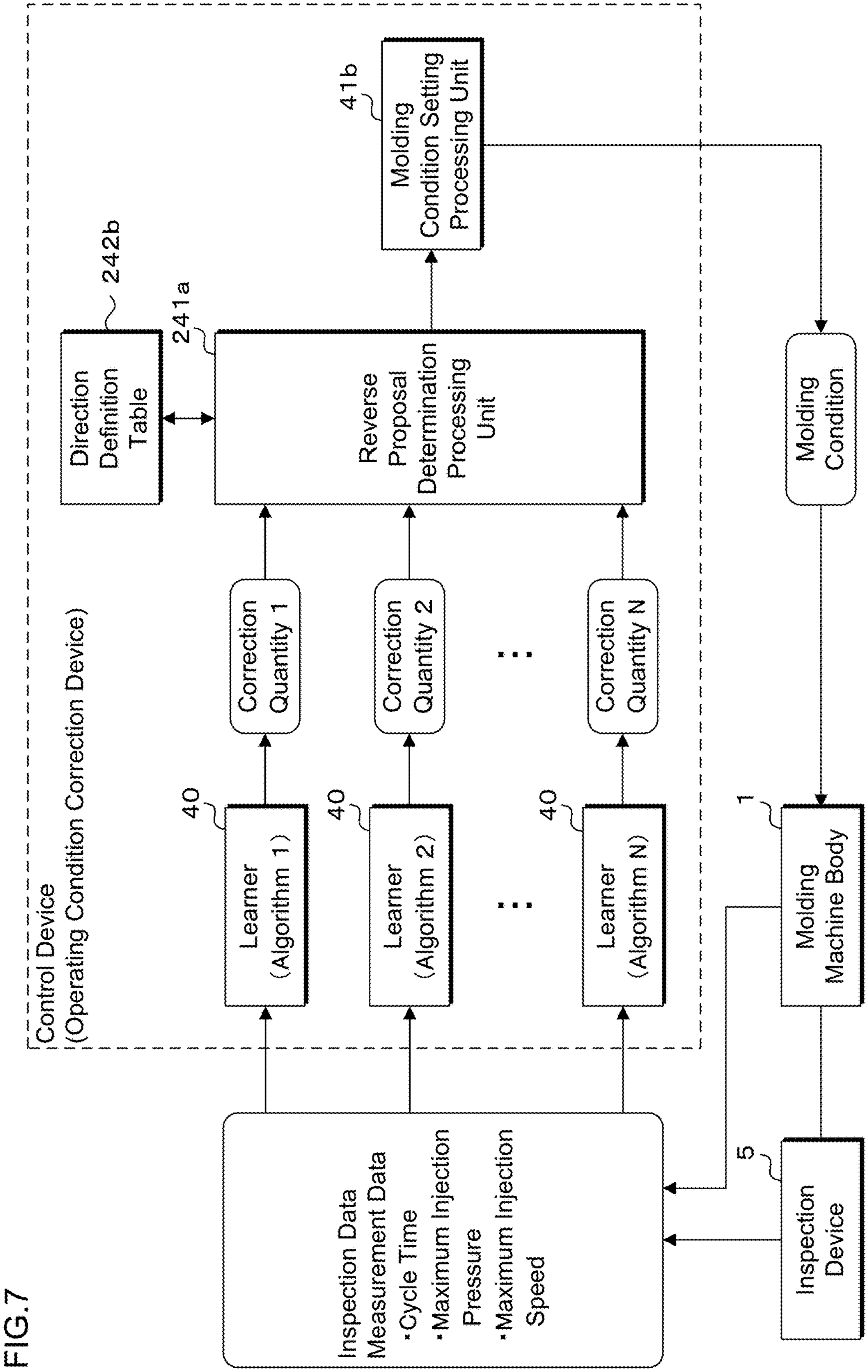
FIG. 7 is a conceptual diagram illustrating an operating condition correction processing method according to the second embodiment.

FIG. 7 is a conceptual diagram illustrating an operating condition correction processing method according to the second embodiment. The reverse proposal determination processing unit 241*a* according to the second embodiment is a functional part that determines whether or not each of the correction quantities respectively output from the multiple learners 40 is the correction quantity related to the reverse proposal by referring to the information in the direction definition table 242*b*.

Specifically, the processor 41 determines the type of defects of a molded product based on the inspection data. The types of defects include, for example, flash and a short shot. The type of defects may be subdivided based on the cause of the defect. The types of defects, for example, may include flash due to resin viscosity and a short shot due to the resin viscosity. The reverse proposal determination processing unit 241*a* refers to the direction definition table 242*b* using the type of the defects of a molded product as a key to read information indicating a accurate correction direction. The reverse proposal determination processing unit 241*a* identifies whether or not a correction quantity to be determined corresponds to the reverse proposal by determining whether or not the positive and negative signs of the change values of the correction quantity match the positive and negative signs of the change values indicated by the information read from the direction definition table 242*b*. For example, the reverse proposal determination processing unit 241*a* selects the correction quantity where all the positive and negative signs match as an accurate correction quantity and excludes the correction quantities other than this correction quantity.

Figure 8:
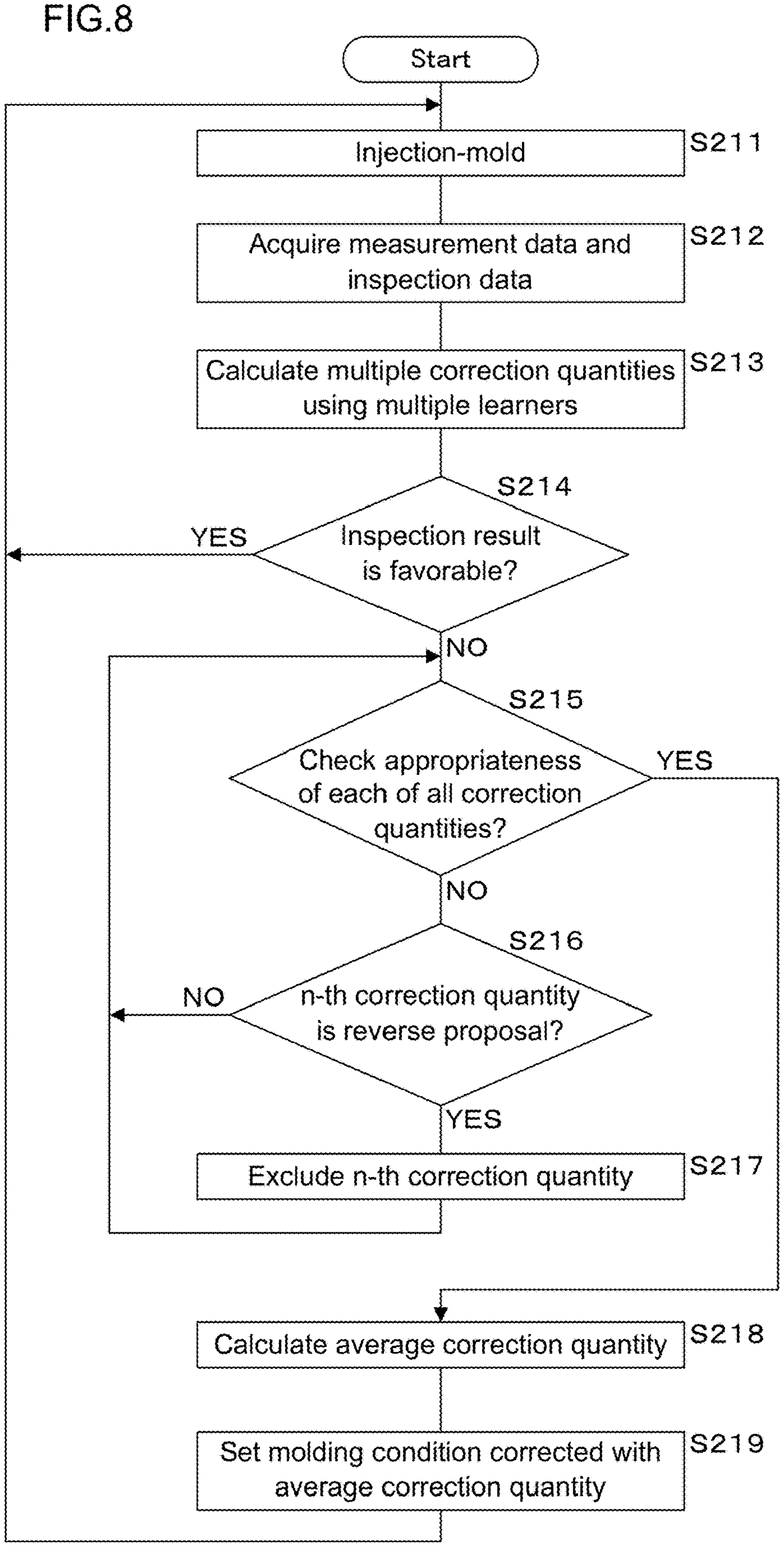
FIG. 8 is a flowchart illustrating an operating condition correction processing procedure according to the second embodiment.

FIG. 8 is a flowchart illustrating an operating condition correction processing procedure according to the second embodiment. The processor 41 performs injection molding as in steps S111 to S113 in the first embodiment to acquire measurement data and inspection data and calculates multiple correction quantities using the multiple learners 40 (step S211, S212, S213). Next, the processor 41 determines whether or not the inspection result is favorable, i.e. whether or not a molded product is a conforming item based on the inspection data (step S214).

If determining that the inspection result is favorable (step S214: YES), the processor 41 returns the processing to step S211. If determining that the inspection result is not favorable (step S214: NO), the processor 41 determines whether or not appropriateness of each of all the correction quantities output from the multiple learners 40 is checked (step S215). If determining that there is a correction quantity that has not been checked for appropriateness (step S215: NO), the processor 41 as the reverse proposal determination processing unit 241*a* specifies the type of the defect of a molded product and determines whether or not the n-th correction quantity corresponds to a reverse proposal referring to the direction definition table 242*b* using the type of the defect as a key (step S216). Here, "n" is an integer starting from 1 and is incremented by 1 each time the processing from steps S215 to S217 is executed.

If determining that the n-th correction quantity is the reverse proposal (step S216: YES), the processor 41 excludes the correction quantity (step S217) and returns the processing to step S215. If determining that the n-th correction quantity corresponds to the accurate correction direction (step S216; NO), the processor 41 returns the processing to step S215 without excluding the correction quantity.

If determining that appropriateness is checked for all the correction quantities at step S215 (step S215: YES), the processor 41 then calculates an average correction quantity using the accurate correction quantities excluding the correction quantities of the reverse proposal (step S218), sets the molding condition corrected with the average correction quantity (step S219) and returns the processing to step S211.

According to the injection molding machine 201 and the control device 4 (operating condition correction device) in the second embodiment configured as above, appropriate setting of the direction definition table 242*b* ensures selection of correction quantities in the accurate direction, allowing appropriate correction of the molding conditions.

Third Embodiment

An injection molding machine 301 according to the third embodiment is different from that of the first embodiment in the correction processing performed after the correction quantity of the reverse proposal is excluded. Since the other configurations of the injection molding machine 301 are similar to those of the injection molding machine 101 in the first embodiment, corresponding parts are designated by similar reference codes and detailed description thereof will not be made.

Figure 9:
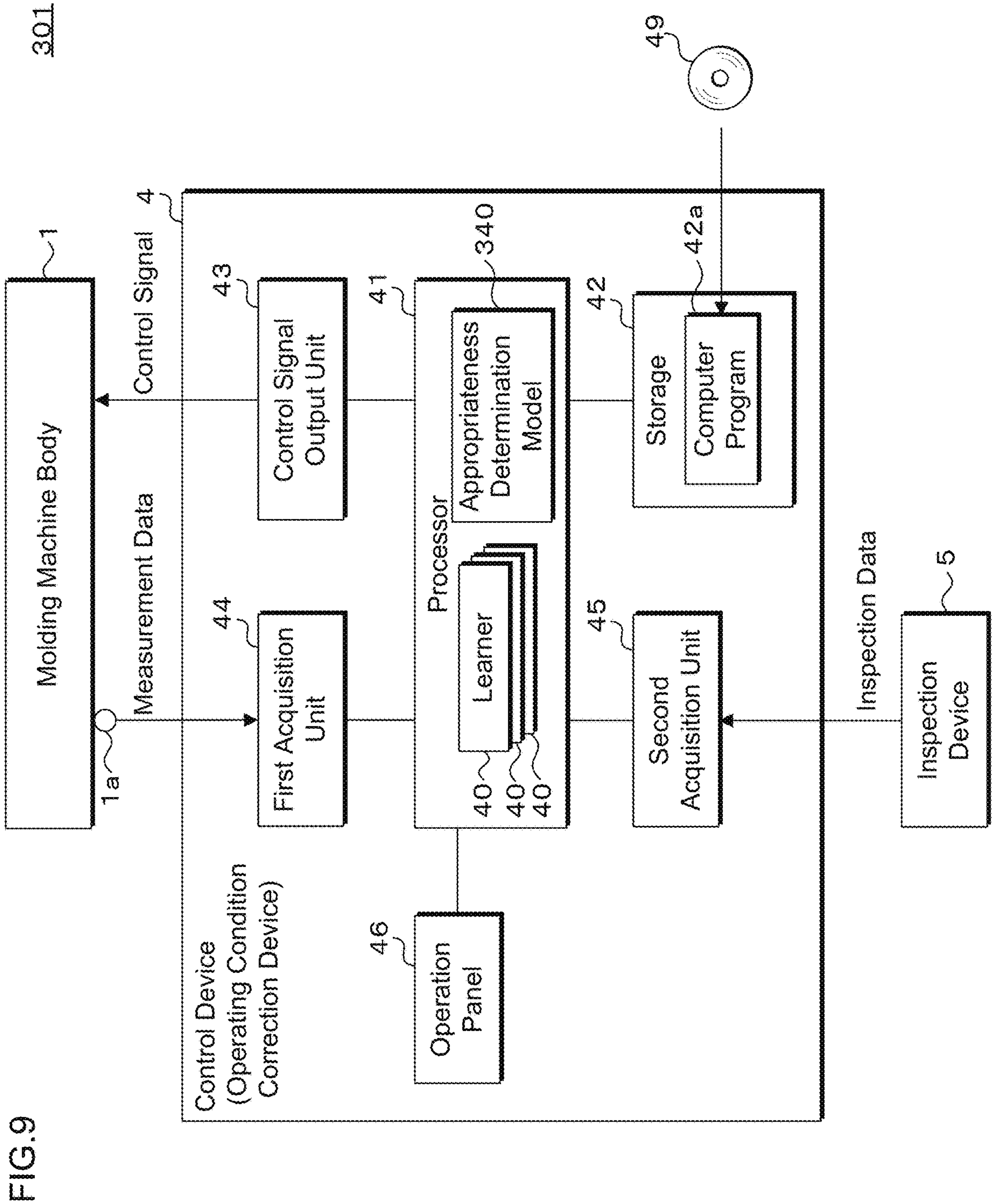
FIG. 9 is a block diagram illustrating an example of the configuration of an injection molding machine according to a third embodiment.

FIG. 9 is a block diagram illustrating an example of the configuration of the injection molding machine 301 according to the third embodiment. The processor 41 according to the third embodiment has an appropriateness determination model 340 as a functional part. The storage 42 stores various coefficients that feature the appropriateness determination model 340.

Figure 10:
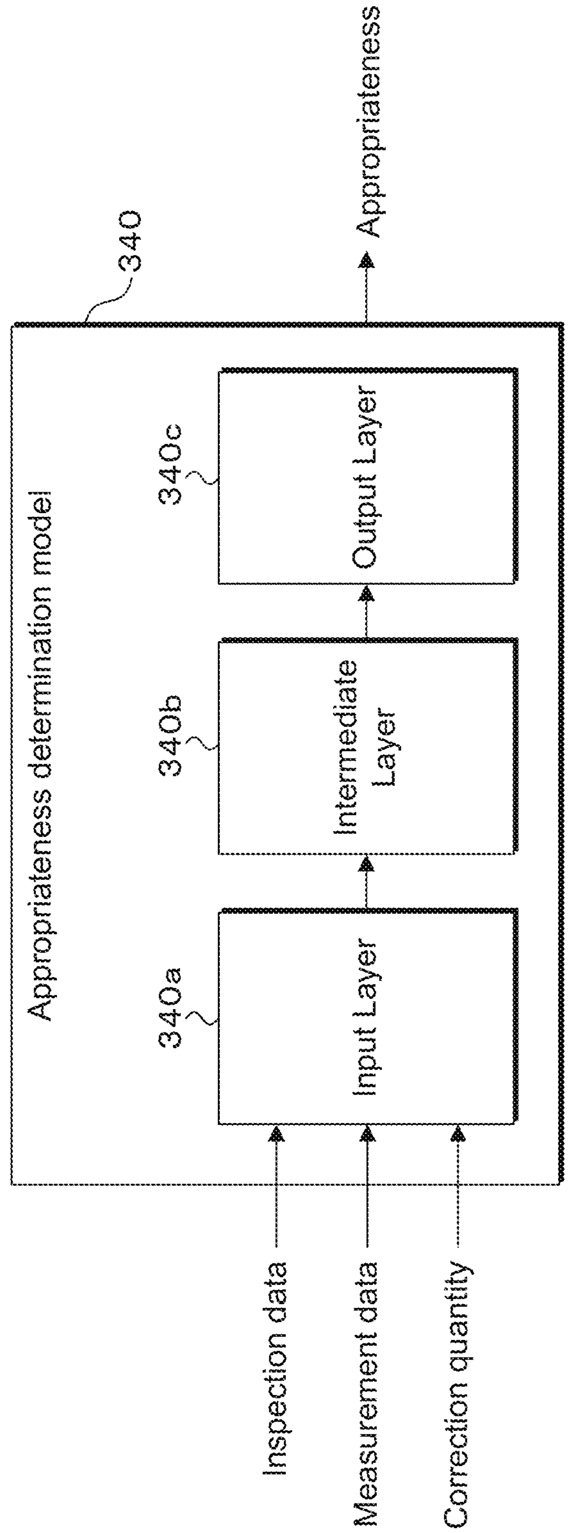
FIG. 10 is a conceptual diagram illustrating an appropriateness determination model according to the third embodiment.

FIG. 10 is a conceptual diagram illustrating an appropriateness determination model 340 according to the third embodiment. The appropriateness determination model 340 is a neural network with an input layer 340*a* to which inspection data, measurement data and a correction quantity are input, an intermediate layer 340*b* for extracting features such as correction quantities and an output layer 340*c* for outputting appropriateness data indicating the appropriateness of the correction quantity calculated based on the extracted features. The appropriateness data is information indicating whether or not the correction quantity is appropriate. For example, the appropriateness data indicates that the correction quantity is more appropriate as the value increases.

The input layer 340*a* of the neural network contains multiple neurons to which inspection data, measurement data and correction quantities are input and passes each input data to the intermediate layer 340*b*.

The intermediate layer 340*b* has multiple layers each consisting of multiple neurons. Each of the layers extracts features related to the appropriateness of the correction quantity from the input data and passes them from the former layer to the latter layer in order, the last layer passing them to the output layer 340*c*.

The output layer 340*c* has a neuron for outputting the appropriateness of the correction quantity, from which the calculation result is output.

Though an example where the appropriateness determination model 340 is a general neural network was mainly described in the third embodiment, it may be another neural network such as a transformer, SVM (Support Vector Machine), a Basian network, a recurrent tree or the like. Alternatively, the appropriateness determination model 340 may be constructed with a reinforcement learning model.

A training method of the appropriateness determination model 340 is described. First, training data containing inspection data, measurement data, a correction quantity and appropriateness data indicating the appropriateness of the correction quantity in association with one another is collected. The correction quantities used for training are all correction quantities having appropriate correction directions. The appropriateness data is generated based on information indicating the degree of improvement in the case where the molding conditions are corrected with the correction quantities. For example, the reduction amount or reduction rate of the area of flash and the reduction amount or reduction rate of the area of a short shot may be used as appropriateness data.

The computer for training a model performs machine learning or deep learning on a neural network model to be trained using the generated training data, to generate the appropriateness determination model 340.

Specifically, the computer inputs the inspection data, measurement data and correction quantity that are included in the training data to the neural network model to be trained and obtains appropriateness data output from the output layer 340*c* after the arithmetic processing in the intermediate layer 340*b*. The computer then compares the appropriateness data output from the output layer 340*c* with the appropriateness data indicated by the teacher data and optimizes the parameters used for arithmetic processing in the intermediate layer 340*b* so that the appropriateness data output from the output layer 340*c* approaches the correct value. The parameters include weights (coupling coefficients) between neurons, for example. The computer optimizes various parameters using the steepest-descent method or the like though a method for optimizing parameters is not limited to a particular one. By repeatedly performing the aforementioned processing, the computer obtains the trained appropriateness determination model 340.

The processor 41 according to the third embodiment can obtain appropriateness data by inputting each of the multiple correction quantities excluding the reverse proposal into the appropriateness determination model 340. The processor 41 then selects the most appropriate correction quantity out of the multiple correction quantities excluding the reverse proposal based on the appropriateness data and corrects the molding conditions.

According to the injection molding machine 301 in the third embodiment configured as above, the use of the appropriateness determination model 340 makes it possible to surely select the most appropriate correction quantity out of the correction quantities having the accurate correction direction and correct the molding condition.

Though the third embodiment is described as a modification of the first embodiment, the technique of the third embodiment may be combined with the second embodiment.

Measures to solve the problem of the present disclosure are additionally described.

1. An operating condition correction method of an industrial machine, comprising:
   - acquiring measurement data obtained by measuring a state of the industrial machine and inspection data obtained by inspecting a state of a product manufactured by the industrial machine;
   - calculating a correction quantity of the operating condition based on the acquired measurement data and inspection data using a plurality of learners trained with an association between the measurement data as well as the inspection data and a correction quantity of the operating condition;
   - determining appropriateness of a correction direction of each of a plurality of the correction quantities calculated using the plurality of learners; and correcting the operating condition based on one or more of the plurality of the correction quantities determined as having the correction direction being appropriate.

2. The operating condition correction method according to clause 1, wherein by a majority decision for the correction direction, appropriateness of the correction quantity is determined.

3. The operating condition correction method according to clause 1 or 2, wherein by referring to a table including a type of a defect indicated by the inspection data and an appropriate correction direction of the operating condition that are associated with each other, using the acquired inspection data as a key, appropriateness of the correction quantity is determined.

4. The operating condition correction method according to clause 3, wherein the industrial machine is an injection molding machine, and the table includes data indicating flash due to resin viscosity, data indicating that an appropriate change value of an injection/pressure holding switchover position is positive, data indicating that an appropriate change value of an injection/pressure holding switchover speed is negative and data indicating that an appropriate change value of an injection/pressure holding switchover pressure is negative that are associated with one another.

5. The operating condition correction method according to clause 3 or 4, wherein the industrial machine is an injection molding machine, and the table includes data indicating a short shot due to resin viscosity, data indicating that an appropriate change value of an injection/pressure holding switchover position is negative, data indicating that an appropriate change value of an injection/pressure holding switchover speed is positive and data indicating that an appropriate change value of an injection/pressure holding switchover pressure is positive that are associated with one another.

6. The operating condition correction method according to any one of clauses 1 to 5, wherein by inputting the calculated correction quantity to an appropriateness determination model that outputs, if a correction quantity is input, appropriateness data indicating appropriateness of the correction quantity, appropriateness of the correction quantity is determined.

7. The operating condition correction method according to any one of clauses 1 to 6, wherein at least one of the plurality of learners is trained with an association between the measurement data as well as the inspection data and the correction quantity using Adam, Momentum or Adagrad.

8. The operating condition correction method according to any one of clauses 1 to 7, further comprising:

calculating an average value of the plurality of the correction quantities determined as having the correction direction being appropriate, and correcting the operating condition based on the calculated average value.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. An operating condition correction method of an industrial machine, comprising:

acquiring measurement data obtained by measuring a state of the industrial machine and inspection data obtained by inspecting a state of a product manufactured by the industrial machine;

calculating a correction quantity of the operating condition based on the acquired measurement data and inspection data using a plurality of learners trained with an association between the measurement data as well as the inspection data and a correction quantity of the operating condition;

determining appropriateness of a correction direction of each of a plurality of the correction quantities calculated using the plurality of learners; and correcting the operating condition based on one or more of the plurality of the correction quantities determined as having the correction direction being appropriate.

2. The operating condition correction method according to claim 1, wherein by a majority decision for the correction direction, appropriateness of the correction quantity is determined.

3. The operating condition correction method according to claim 1, wherein by referring to a table including a type of a defect indicated by the inspection data and an appropriate correction direction of the operating condition that are associated with each other, using the acquired inspection data as a key, appropriateness of the correction quantity is determined.

4. The operating condition correction method according to claim 3, wherein the industrial machine is an injection molding machine, and the table includes data indicating flash due to resin viscosity, data indicating that an appropriate change value of an injection/pressure holding switchover position is positive, data indicating that an appropriate change value of an injection/pressure holding switchover speed is negative and data indicating that an appropriate change value of an injection/pressure holding switchover pressure is negative that are associated with one another.

5. The operating condition correction method according to claim 3, wherein the industrial machine is an injection molding machine, and the table includes data indicating a short shot due to resin viscosity, data indicating that an appropriate change value of an injection/pressure holding switchover position is negative, data indicating that an appropriate change value of an injection/pressure holding switchover speed is positive and data indicating that an appropriate change value of an injection/pressure holding switchover pressure is positive that are associated with one another.

6. The operating condition correction method according to claim 1, wherein by inputting the calculated correction quantity to an appropriateness determination model that outputs, if a correction quantity is input, appropriateness data indicating appropriateness of the correction quantity, appropriateness of the correction quantity is determined.

7. The operating condition correction method according to claim 1, wherein at least one of the plurality of learners is trained with an association between the measurement data as well as the inspection data and the correction quantity using Adam, Momentum or Adagrad.

8. The operating condition correction method according to claim 1, further comprising:

calculating an average value of the plurality of the correction quantities determined as having the correction direction being appropriate, and correcting the operating condition based on the calculated average value.

9. An operating condition correction device for correcting an operating condition of an industrial machine, comprising:

an acquisition unit that acquires measurement data obtained by measuring a state of the industrial machine and inspection data obtained by inspecting a state of a product manufactured by the industrial machine;

a plurality of learners, trained with an association between the measurement data as well as the inspection data and a correction quantity of the operating condition, that calculates a correction quantity of the operating condition based on the acquired measurement data and inspection data;

a determination unit that determines appropriateness of a correction direction of each of a plurality of the correction quantities calculated using the plurality of learners; and a correction unit that corrects the operating condition based on one or more of the plurality of the correction quantities determined as having the correction direction being appropriate.

10. A molding machine provided with the operating condition correction device according to claim 9.

11. A non-transitory computer readable recording medium storing a program causing a computer to execute processing of correcting an operating condition of an industrial machine, comprising:

acquiring measurement data obtained by measuring a state of the industrial machine and inspection data obtained by inspecting a state of a product manufactured by the industrial machine;

calculating a correction quantity of the operating condition based on the acquired measurement data and inspection data using a plurality of learners trained with an association between the measurement data as well as the inspection data and a correction quantity of the operating condition;

determining appropriateness of a correction direction of each of a plurality of the correction quantities calculated using the plurality of learners; and correcting the operating condition based on one or more of the plurality of the correction quantities determined as having the correction direction being appropriate.

* * * * *